US008528209B2

(12) United States Patent
Ikegame et al.

(10) Patent No.: US 8,528,209 B2
(45) Date of Patent: Sep. 10, 2013

(54) METHOD FOR MANUFACTURING DISCHARGE PORT MEMBER AND METHOD FOR MANUFACTURING LIQUID DISCHARGE HEAD

(75) Inventors: Ken Ikegame, Atsugi (JP); Hiroaki Mihara, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 458 days.

(21) Appl. No.: 12/943,776

(22) Filed: Nov. 10, 2010

(65) Prior Publication Data

US 2011/0139330 A1 Jun. 16, 2011

(30) Foreign Application Priority Data

Dec. 15, 2009 (JP) ................................ 2009-283896

(51) Int. Cl.

| | |
|---|---|
| ***B21D 53/76*** | (2006.01) |
| ***B23P 17/00*** | (2006.01) |
| ***B41J 2/135*** | (2006.01) |
| ***B41J 2/05*** | (2006.01) |

(52) U.S. Cl.

USPC ................. 29/890.1; 347/44; 347/45; 347/65

(58) Field of Classification Search

USPC ................ 29/890.1; 216/27; 347/20, 40, 44, 347/45, 65, 68

See application file for complete search history.

(56) References Cited

U.S. PATENT DOCUMENTS

| | | | | |
|---|---|---|---|---|
| 4,255,237 | A * | 3/1981 | Obert et al. | 205/73 |
| 4,716,423 | A * | 12/1987 | Chan et al. | 347/65 |
| 6,502,929 | B1 * | 1/2003 | Tanaka et al. | 347/71 |
| 7,658,477 | B2 * | 2/2010 | Kamito | 347/68 |
| 2002/0149652 | A1 * | 10/2002 | Sakamoto et al. | 347/68 |
| 2004/0029305 | A1 * | 2/2004 | Chung et al. | 438/27 |
| 2004/0105996 | A1 * | 6/2004 | Takagi et al. | 428/606 |
| 2004/0125178 | A1 * | 7/2004 | Akahane et al. | 347/71 |

FOREIGN PATENT DOCUMENTS

| | | | |
|---|---|---|---|
| CN | 1254648 | A | 5/2000 |
| CN | 1935515 | A | 3/2007 |
| CN | 1978067 | A | 6/2007 |
| CN | 101062494 | A | 10/2007 |
| CN | 101115621 | A | 1/2008 |
| CN | 101135053 | A | 3/2008 |
| JP | 7-156389 | | 6/1995 |

(Continued)

OTHER PUBLICATIONS

Chinese Office Action dated Jan. 31, 2013 in Chinese Application No. 201010582101.6.

*Primary Examiner* — David Angwin

(74) *Attorney, Agent, or Firm* — Fitzpatrick, Cella, Harper & Scinto

(57) ABSTRACT

A method for manufacturing a discharge port member used in a liquid discharge head, comprising in the following order, preparing a substrate at least whose surface is conductive, the substrate having, formed on said surface, a first insulating resist for forming a discharge port and a second insulating resist for forming a recessed portion of a wall of a flow path, forming on surface a first plating layer by plating using said first resist and said second resist as a mask, removing said second resist, forming a second plating layer on an exposed portion of said substrate from which said second resist has been removed, said second plating layer being formed by plating using said first resist as a mask, said second plating layer forming said recessed portion of said wall, and removing said first resist to form said discharge port and removing said substrate.

7 Claims, 7 Drawing Sheets

(56) References Cited

FOREIGN PATENT DOCUMENTS

| | | | | |
|---|---|---|---|---|
| JP | 2000-177139 | A | | 6/2000 |
| JP | 2002-1966 | A | | 1/2002 |
| JP | 2002001966 | | * | 1/2002 |
| JP | 2002-103613 | A | | 4/2002 |

* cited by examiner

METHOD FOR MANUFACTURING DISCHARGE PORT MEMBER AND METHOD FOR MANUFACTURING LIQUID DISCHARGE HEAD

BACKGROUND OF THE INVENTION

1. Field of the Invention

The present invention relates to a method for manufacturing a discharge port member having a liquid discharge port and to a method for manufacturing a liquid discharge head.

2.Description of the Related Art

A liquid discharge head includes a fine discharge port provided in a discharge port member and a flow path in communication with the discharge port, and recording is performed by discharging liquid supplied from the flow path toward a recording medium.

Japanese Laid-Open Patent Application No. 2002-103613 discloses a method for manufacturing a discharge port member having recessed portions provided in sections that form ceiling portions of the flow paths of the discharge port member. In this method, a first plating layer is formed by plating on a conductive substrate on which a first resist corresponding to discharge ports is formed. A second resist is then formed on the first plating layer, and a second plating layer is formed by plating. Then the second resist is removed, and portions from which the second resist has been removed serve as the recessed portions corresponding to the discharge ports. The formation of the recessed portions is advantageous for refilling with liquid because the volume of the flow paths is larger than the volume when no recessed portions are formed.

However, during patterning by exposure to light to form the second resist, the light passing through the second resist can be reflected from the surface of the first plating layer. Therefore, portions of the second resist that should not be exposed to light can be exposed to the reflected light. This may result in an undesired resist shape, and the flow paths formed from the plating layers may not have the desired shape.

Accordingly, it is an object of the present invention to solve the above problem. Another object is to provide a discharge port member manufacturing method that can produce, at a high yield, a discharge port member having recessed portions and formed with high shape accuracy.

SUMMARY OF THE INVENTION

To solve the above mentioned object, a method for manufacturing a discharge port member used in a liquid discharge head from which a liquid is discharged, the discharge port member including a discharge port that discharges the liquid and a recessed portion that is a part of a wall of a flow path of said liquid, the flow path being in communication with said discharge port, the method comprising in the following order: a step of preparing a substrate at least whose surface is conductive, the substrate having, formed on the surface, a first insulating resist for forming the discharge port and a second insulating resist for forming said recessed portion of the wall of the flow path; a first plating step of forming on said surface a first plating layer, which forms a part of the discharge port member, by plating using the first resist and the second resist as a mask, wherein the first resist is exposed through a first opening of the first plating layer, and the second resist is exposed through a second opening of the first plating layer; a step of removing the second resist; a second plating step of forming a second plating layer on an exposed portion of the substrate from which said second resist has been removed, the second plating layer being formed by plating using the first resist as a mask, said second plating layer forming said recessed portion of said wall; and a step of removing said first resist to form the discharge port and removing the substrate, whereby the discharge port member is formed.

According to the present invention, a discharge port member having recessed portions and formed with high shape accuracy can be obtained at a high yield.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Hereinafter, preferred embodiments of the present invention will be described in detail. In the following description, the invention is applied to an ink jet recording head as an example. However, the application range of the invention is not limited thereto. The invention is also applicable to the manufacturing of liquid discharge heads used to produce biochips and liquid discharge heads used to print electronic circuits. Examples of the liquid discharge head include, in addition to the ink jet recording head, heads for manufacturing color filters.

Numerical values used in the following embodiments are examples only, and the invention is not limited thereto. The invention is not limited to the embodiments, and any combinations of these embodiments are encompassed by the invention. The invention is also applicable to other technologies included in the inventive idea described in the claims of the specification.

(First Embodiment)

FIGS. 1A, 1B, 2A and 2B show an exemplary structure of a liquid discharge head manufactured in accordance with the present embodiment.

Figure 1A:
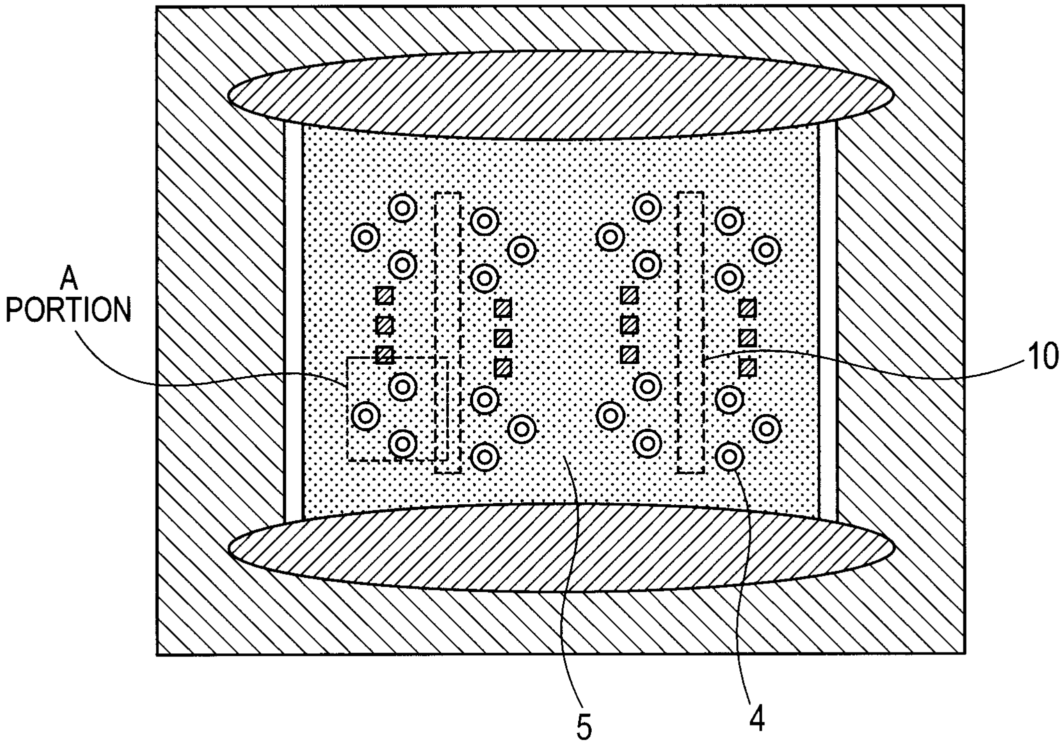
FIGS. 1A and 1B are schematic top views illustrating the structure around a discharge port member of a liquid discharge head manufactured in the first embodiment.
Figure 1B:
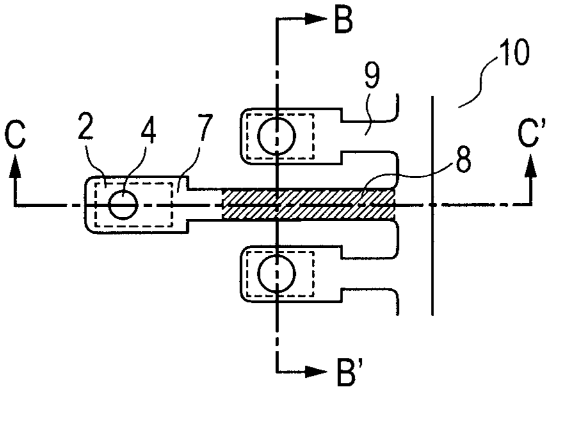
Figure 2A:
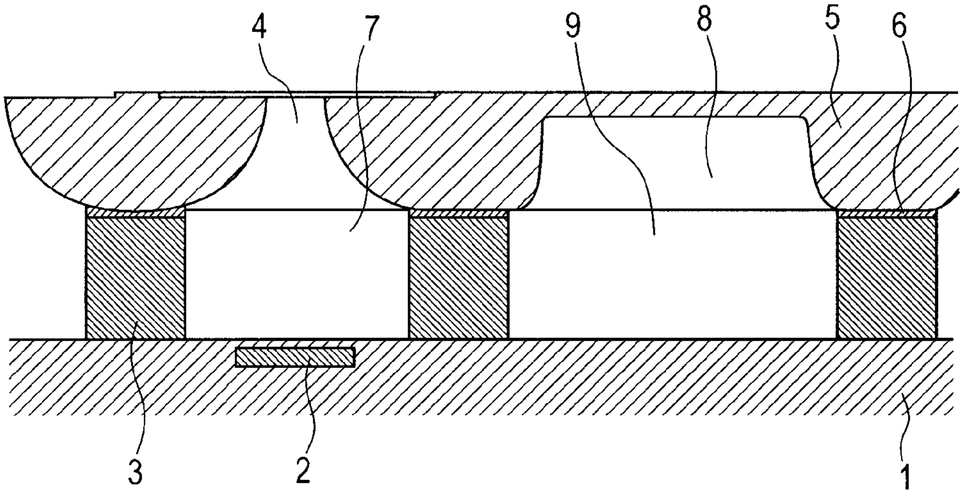
FIGS. 2A and 2B are schematic cross sectional views illustrating the structure around discharge ports in the liquid discharge head shown in FIGS. 1A and 1B.
Figure 2B:
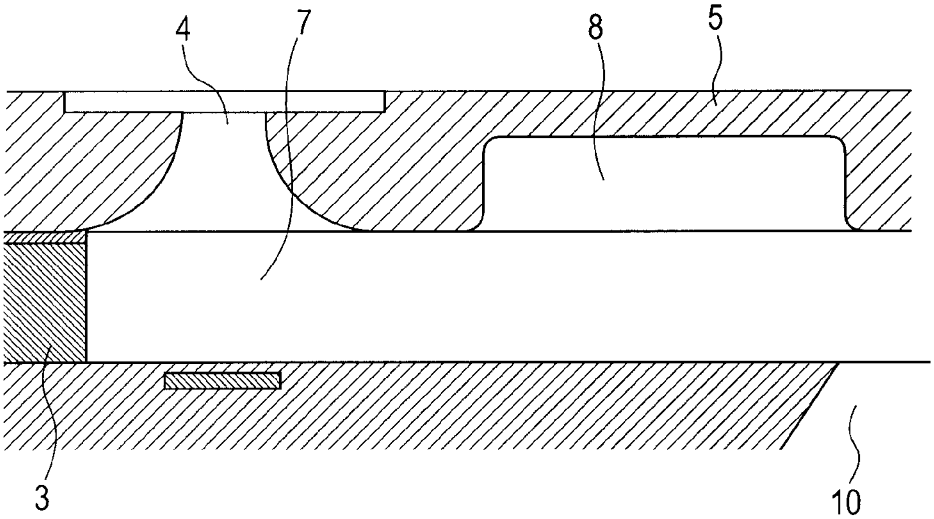

FIG. 1A is a schematic top view of the liquid discharge head, and FIG. 1B is an enlarged view of the portion A in FIG. 1A. FIG. 2A is a schematic cross sectional view taken along B-B' in FIG. 1B, and FIG. 2B is a schematic cross sectional view taken along C-C' in FIG. 1B.

In FIGS. 1A and 1B, one or more ink supply ports are formed in a silicon (Si) substrate 1. When a plurality of ink supply ports 10 are formed, they are formed in a row. As shown FIGS. 1A and 1B, discharge ports 4 are arranged in a staggered pattern.

In FIGS. 1A to 2B, a plurality of energy generation elements 2 are formed in the substrate 1. These energy generation elements 2 are arranged in rows on opposite sides of each ink supply port 10 interposed therebetween. Flow path walls 3 made of, for example, a resin are disposed on the substrate 1, and a discharge port member 5 is bonded onto the flow path walls 3 with an adhesive 6. The discharge port member 5 is bonded onto the flow path walls 3 such that liquid chambers 7 and the discharge ports 4 are positioned above the energy generation elements 2. Flow paths 9 are formed by the discharge port member 5, the flow path walls 3, and the element substrate 1 such that the liquid chambers 7 are in communication with the ink supply ports 10. The discharge port member 5 forms the upper walls of the flow paths 9 and has recesses 8 provided in portions corresponding to the flow paths 9. These recesses 8 inhibit air bubbles from residing during filling with ink, and stable ink dischargeability can thereby be ensured.

The liquid chambers 7 are surrounded by the flow path walls 3, the element substrate 1, and the discharge port member 5 and are regions formed above the energy generation elements. The liquid chambers 7 as well as the flow paths 9 and the ink supply ports 10 are filled with the ink. The energy generated by the energy generation elements 2 causes the ink in the liquid chambers 7 to be formed into ink droplets, and the ink droplets fly from the discharge ports 4 of the discharge port member 5 and adhere to a printing paper sheet (not shown).

In the present embodiment, single stage recesses are formed in the discharge port member 5, but two or more stage recesses may be formed therein. The shape of the recesses may be appropriately selected according to the shape of the flow paths. For example, the depth and width of the recesses may be changed. The recesses may have a shape formed in consideration of ink discharge efficiency.

Next, a process of manufacturing the liquid discharge head having the structure shown in FIGS. 1A to 2B will be described in detail with reference to FIGS. 3A to 3F showing cross-sections taken along C-C' in FIG. 1B.

Figure 3A:
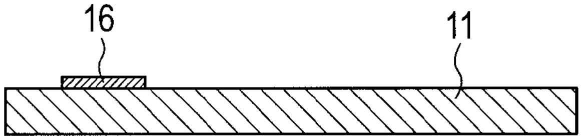
FIGS. 3A, 3B, 3C, 3D, 3E, and 3F are schematic cross sectional process diagrams illustrating a process of forming a discharge port member of a first embodiment.
Figure 3B:
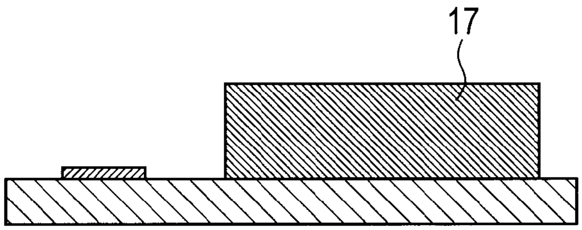

First, as shown in FIG. 3A, a first resist layer 16 is formed on a substrate 11 at least whose surface is conductive. Further, the first resist layer 16 is formed on portions corresponding to the discharge ports (portions in which the discharge ports are to be formed). The first resist layer 16 serves as a mold material for the end portions of the discharge ports. Next, as shown in FIG. 3B, a second resist layer 17 is formed on portions of the substrate 11 that correspond to the recesses (portions in which the recesses are to be formed). The surface of the substrate 11 is conductive so as to function as a seed layer for plating. The entire substrate 11 may be conductive, or the substrate may be formed from a base material such as silicon and a conductor that forms the surface functioning as the seed layer.

An insulating material such as a resist material or a silicon-containing compound may be used as the material for the first resist layer 16. Examples of the silicon-containing compound include silicon nitride (SiN), silicon oxide (SiO), and silicon oxynitride (SiON). Examples of the resist material include a positive resist and a negative resist.

Examples of the second resist layer 17 include a positive resist and a negative resist.

Preferably, when a resist material is used for the first resist layer 16, a negative resist is used for one of the first and second resist layers that is formed first, and a positive resist is used for a layer that is formed later. Particularly, it is preferable to use a negative resist for the first resist layer 16 and a positive resist for the second resist layer 17.

The thickness of the first resist layer 16 is, for example, 0.01 to 10 μm, preferably 0.01 to 3 μm, and more preferably 0.1 to 2 μm.

The thickness of the second resist layer 17 is, for example, 1.5 to 3,000 μm, preferably 6 to 250 μm, and more preferably 6 to 150 μm.

The width of the second resist layer 17 is appropriately selected according to the width of the flow paths to be formed.

Any conductive materials may be used as the material for the conductive substrate. Examples of the usable substrate include a metal substrate and a substrate including a conductive layer formed on, for example, a resin, ceramic, or glass material. The conductive layer may be formed using a conductive metal such as copper, nickel, chromium, or iron by a thin-film formation method such as sputtering, vapor deposition, plating, or ion plating.

Figure 3C:
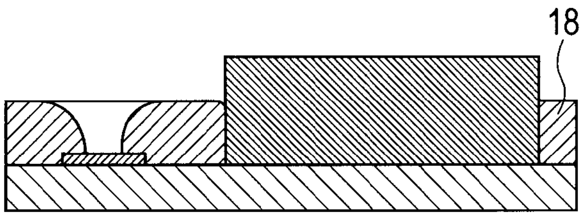

Next, as shown in FIG. 3C, a first plating layer 18 is formed by precipitating a metal material such as nickel (Ni) by electroforming on the exposed surface portions of the substrate 11 having the first resist layer 16 and the second resist layer 17 formed thereon. The first plating layer is formed such that the height of its upper surface is equal to or lower than the upper surface of the second resist layer 17. The upper surface of the first plating layer formed is preferably equal to or higher than the upper surface of the first resist layer 16 and more preferably equal to or higher than one-third of the height of the second resist layer 17. The first plating layer is formed so as to overhang the first resist layer 16 with openings formed above the first resist layer 16.

In addition to nickel, for example, palladium, copper, gold, rhodium, a composite material thereof, or the like may be used as the material for the discharge port member. The thickness of the first plating layer is, for example, 1 to 1,000 μm, preferably 5 to 750 μm, and more preferably 5 to 400 μm.

Figure 3D:
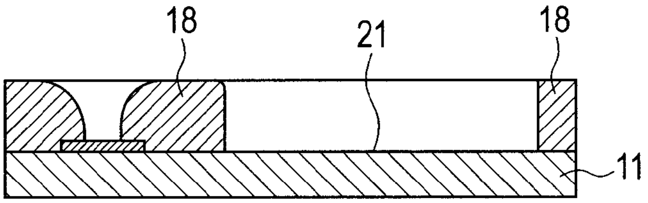

Next, as shown in FIG. 3D, the second resist layer 17 is removed. By removal of the second resist layer 17, the conductive substrate is partially exposed to form an exposed surface 21.

Figure 3E:
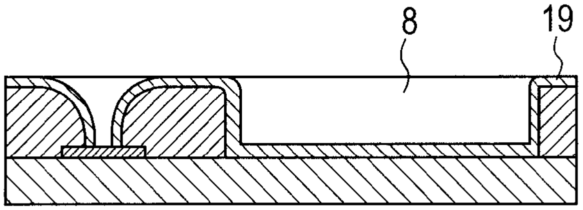

Next, as shown in FIG. 3E, a second plating layer 19 is formed by electroforming on the exposed surface of the conductive substrate and on the first plating layer 18 so as to cover it, and the discharge port member 5 is thereby formed. The second plating layer is formed such that the openings are formed above the first resist layer 16.

The thickness of the second plating layer is, for example, 1 to 200 μm, preferably, 2 to 100 μm, and more preferably 2 to 50 μm.

The second resist layer 17 can be removed by, for example, development.

Figure 3F:
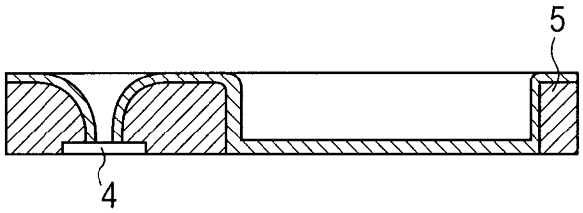

Next, as shown in FIG. 3F, the discharge port member 5 is detached from the substrate 11, and the discharge port member 5 is thereby obtained.

This discharge port member 5 is bonded to the substrate 1 such that the discharge ports 4 are disposed at positions corresponding to the energy generation elements 2 of the substrate 1 that generate energy used to discharge liquid. The liquid discharge head shown in FIGS. 2A and 2B is thereby obtained.

The present invention is different from the conventional method in that the second resist is not formed on a plating layer. Therefore, pattern deformation does not occur at the interface between the first and second plating layers and near the discharge ports, so that the plating layers can be easily formed into desired shapes by electroforming.

(Second Embodiment)

Figure 7A:
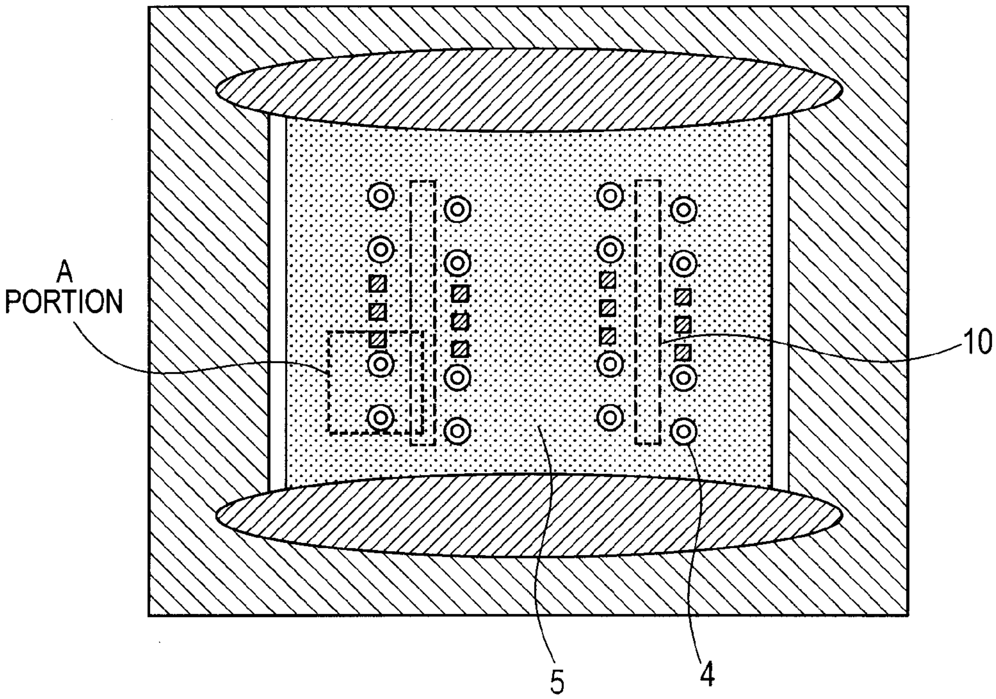
FIGS. 7A, 7B, and 7C are schematic top views illustrating the structures around the discharge port members of the liquid discharge heads manufactured in the second and third embodiments.
Figure 7B:
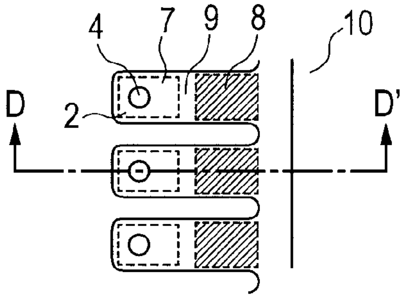

In the present embodiment, a process of manufacturing a liquid discharge head shown in FIGS. 7A and 7B will be described. FIG. 7A is a schematic top view of a discharge port member in an exemplary configuration of the liquid discharge head, and FIG. 7B is an enlarged view of the portion A in FIG. 7A.

The process of manufacturing the liquid discharge head having the structure shown in FIGS. 7A and 7B will be described in detail with reference to FIGS. 4A to 4E showing cross-sections taken along D-D' in FIG. 7B.

Figure 4A:
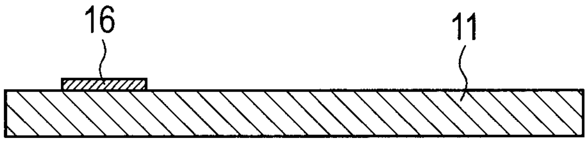
FIGS. 4A, 4B, 4C, 4D, and 4E are schematic cross sectional process diagrams illustrating a process of forming a discharge port member of a second embodiment.
Figure 4B:
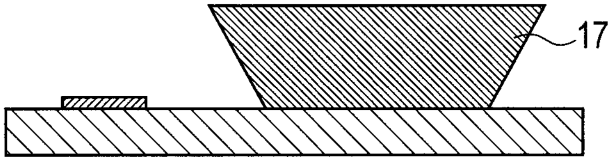

First, as shown in FIG. 4A, a first resist layer 16 is formed on portions of a substrate 11 that correspond to discharge ports (portions in which the discharge ports are to be formed). The first resist layer 16 serves as a mold material for the end portions of the discharge ports. Next, as shown in FIG. 4B, a second resist layer 17 is formed on portions of the substrate 11 that correspond to recesses (portions in which the recesses are to be formed). In FIG. 4B, the second resist layer 17 is formed to have a reverse tapered shape. More specifically, the second resist layer 17 is formed such that its vertical cross-section along a liquid flow path has the reverse tapered shape. Such a shape can reduce the flow resistance of the liquid flow path to be formed.

Figure 4C:
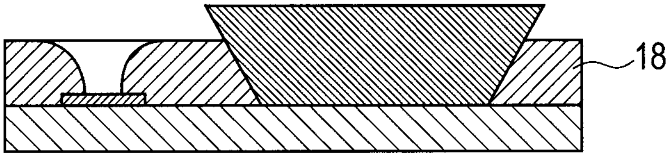

Next, as shown in FIG. 4C, a first plating layer 18 is formed by precipitating nickel (Ni) by electroforming on the exposed surface portions of the substrate 11 having the first resist layer 16 and the second resist layer 17 formed thereon. The first plating layer is formed such that the height of its upper surface is equal to or lower than the upper surface of the second resist layer 17. The upper surface of the first plating layer formed is preferably equal to or higher than the upper surface of the first resist layer 16 and more preferably equal to or higher than one-third of the height of the second resist layer 17. The first plating layer is formed so as to overhang the first resist layer 16 with openings formed above the first resist layer 16.

Figure 4D:
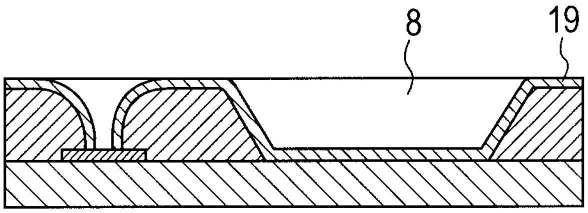

Next, the second resist layer 17 is removed. Then a second plating layer 19 is formed by electroforming on the exposed surface of the conductive substrate and on the first plating layer 18 so as to cover it, as shown in FIG. 4D, and a discharge port member 5 is thereby formed. The second plating layer is formed such that the openings are formed above the first resist layer 16.

Figure 4E:
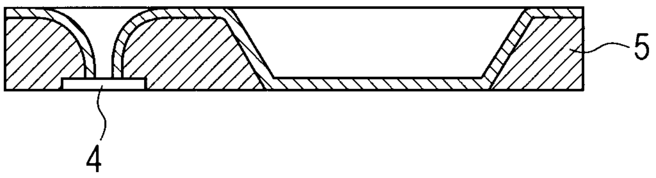

Next, as shown in FIG. 4E, the discharge port member 5 is detached from the substrate 11, and the discharge port member 5 is thereby obtained.

In the thus-obtained discharge port member 5, the recesses have a tapered shape. Therefore, the resistance to the flow of ink is smaller than that when the side walls of the recesses are substantially vertical, and air bubbles, etc. are less likely to reside in the recesses. In the liquid discharge head obtained by bonding the discharge port member 5 manufactured in the present embodiment to the walls of the flow paths, print failures such as non-discharge due to insufficient refilling with ink do not occur even when the ink is continuously discharged, and therefore the liquid discharge head has good printing performance.

(Third Embodiment)

Figure 7C:
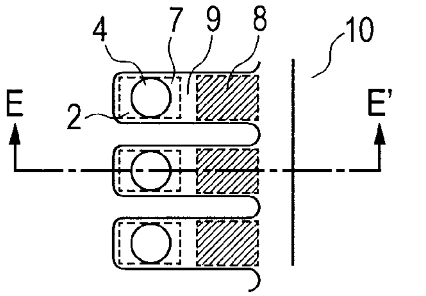

In the present embodiment, a process of manufacturing a liquid discharge head shown in FIGS. 7A and 7C is described. FIG. 7A is the schematic top view of a discharge port member in an exemplary configuration of the liquid discharge head, and FIG. 7C is the enlarged view of the portion A in FIG. 7A.

The process of manufacturing the liquid discharge head having the structure shown in FIGS. 7A and 7C will be described in detail with reference to cross-sections taken along E-E' in FIG. 7C.

Figure 6A:
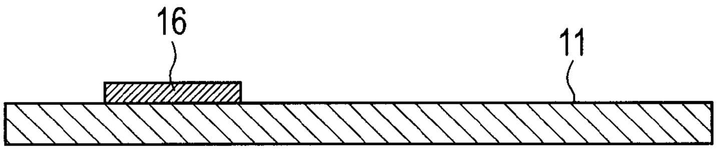
FIGS. 6A, 6B, 6C, 6D, and 6E are schematic cross sectional process diagrams illustrating a process of forming a discharge port member of a third embodiment.
Figure 6B:
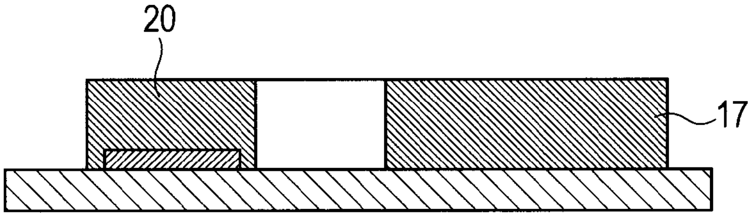

First, as shown in FIG. 6A, a first resist layer 16 made of an insulating material is formed on portions of a substrate 11 that correspond to discharge ports (portions in which the discharge ports are to be formed). Next, as shown in FIG. 6B, a third resist layer 20 is formed on the first resist layer 16, and a second resist layer 17 is formed on portions of the substrate 11 that correspond to recesses (portions in which the recesses are to be formed). The third resist layer 20 is formed on the first resist layer 16 so as to cover the first resist layer 16, as shown in FIG. 6B. More specifically, the shape of the third resist layer 20 in in-plane directions is larger than the shape of the first resist layer 16, and the third resist layer 20 covers the first resist layer 16. The in-plane directions are directions along the surface of the substrate and are horizontal directions when the substrate is placed horizontally.

The second resist layer 17 and the third resist layer 20 can be formed from a single resist material by providing the resist material on the substrate 11 having the first resist layer 16 formed thereon so as to cover the first resist layer 16 and then patterning the resist material such that the resist material is partially removed.

Preferably, when a resist is used for the first resist layer 16, a negative resist is used for the first resist layer 16, and a positive resist is used for the second resist layer 17.

The thickness of the first resist layer 16 is, for example, 0.1 to 10 μm, preferably 0.1 to 3 μm, and more preferably 0.1 to 2 μm.

The thickness of the second resist layer 17 is, for example, 1.5 to 3,000 μm, preferably 6 to 250 μm, and more preferably 6 to 150 μm.

Figure 6C:
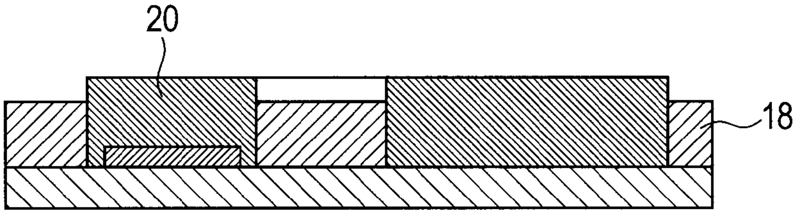

Next, as shown in FIG. 6C, a first plating layer 18 is formed by electroforming on the exposed surface of the substrate 11. The first plating layer is formed such that the height of its upper surface is equal to or lower than the upper surface of the second resist layer 17. The upper surface of the first plating layer formed is preferably equal to or higher than the upper surface of the first resist layer 16 and more preferably equal to or higher than one-third of the height of the second resist layer 17.

The thickness of the first plating layer is, for example, 1 to 1,000 μm, preferably 5 to 750 μm, and more preferably 5 to 400 μm.

Figure 6D:
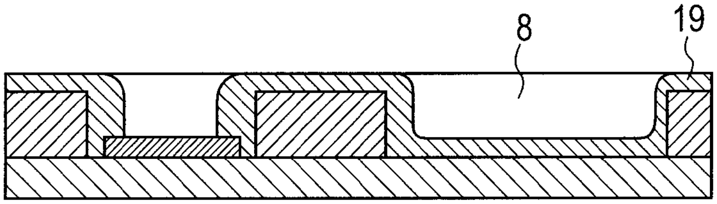

Next, the second resist layer 17 and the third resist layer 20 are removed. Then a second plating layer 19 is formed by electroforming on the exposed surface of the substrate 11 and on the first plating layer 18 so as to cover it, as shown in FIG. 6D. A discharge port member 5 is thereby formed. The second plating layer is formed so as to overhang the first resist layer 16 with openings formed above the first resist layer 16.

The thickness of the second plating layer is, for example, 1 to 200 μm, preferably 2 to 200 μm, and more preferably 2 to 50 μm.

Figure 6E:
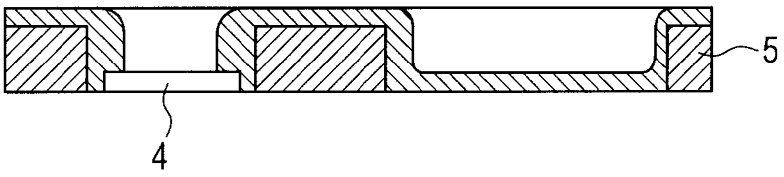

Next, as shown in FIG. 6E, the discharge port member 5 is detached from the substrate 11, and the discharge port member 5 is thereby obtained.

In the discharge port member 5 manufactured in the present embodiment, discharge ports each having a cross-section with straight sections can be formed, and no edges are formed in liquid flow paths and in the discharge ports. Since the discharge ports have straight sections, the straightness of the discharged ink can be improved. In the present embodiment, even when nozzles are formed at high density, a discharge port member having good discharge performance can be easily manufactured by electroforming with the required thickness of the discharge port member ensured.

In the liquid discharge head obtained by bonding the discharge port member 5 manufactured in the present embodiment to flow path walls 3, print failures such as non-discharge due to insufficient refilling with ink do not occur even when the ink is continuously discharged. Therefore, the liquid discharge head has good printing performance, and discharged ink droplets have good straightness.

(Fourth Embodiment)

In the structure in the third embodiment, the shape of the third resist layer 20 in the in-plane directions is larger than the shape of the first resist layer 16, and the third resist layer 20 covers the first resist layer 16 in the step shown in FIG. 6B.

The first resist layer 16 and the third resist layer 20 may form a different stacking structure. For example, the stacked first and third resist layers 16 and 20 may have the same planar shape. More specifically, in this stacked structure, the first resist layer 16 and the third resist layer 20 are formed so as to have the same shape in the in-plane directions.

In another possible stacked structure, the shape of the first resist layer 16 in the in-plane directions is larger than the shape of the third resist layer 20, and the third resist layer 20 is formed inside the first resist layer 16. The structure formed of the first resist layer 16 and the third resist layer 20 may be appropriately selected in consideration of the target shape of the discharge ports.

EXAMPLE 1

Next, example 1 of the present invention will be described. In this Example, the liquid discharge head shown in FIGS. 1A to 2B was manufactured by electroforming. In this Example, the pitch of nozzles was 1,200 dpi, and the discharge ports 4 were arranged in a staggered pattern. In this Example, a discharge port member having discharge ports with a hole diameter d of 10 μm and recesses with a width of 5 μm, a length of 60 μm, and a depth of 8 μm was produced.

FIGS. 3A to 3F are diagrams illustrating the process of manufacturing in a cross-section taken along C-C' in FIG. 1B.

First, as shown in FIG. 3A, a substrate 11 made of a stainless steel plate, or the like was coated with a negative resist forming an insulating layer to a thickness of 1 μm. Then a mask patterned such that the negative resist remained on 30 μm diameter portions corresponding to the discharge ports (portions in which the discharge ports were to be formed) was placed on the resist, and a first resist 16 (corresponding to the insulating layer) was formed by photolithography. SU-8 2000 (product of Kayaku MicroChem) was used as the negative resist.

Next, the substrate 11 and the first resist 16 were coated with a positive resist forming a resist layer to a thickness of 20 μm. Then a mask patterned such that the positive resist remained on portions with a width of 11 μm and a length of 66 μm in which recesses were to be formed was placed on the positive resist, and a second resist 17 (corresponding to a resist layer) was formed by photolithography, as shown in FIG. 3B. In this Example, PMER P-LA900PM (product of TOKYO OHKA KOGYO Co., Ltd.) was used as the positive resist.

Next, as shown in FIG. 3C, the substrate 11 having the first resist 16 and the second resist 17 formed thereon was plated by electroforming with nickel (Ni) to a thickness of 8 μm, whereby a first plating layer 18 was formed. In this electroforming process, holes having a diameter of 16 μm were formed in portions corresponding to the discharge ports.

Next, the entire plated side surface of the substrate was exposed to light, and the second resist 17 was developed and removed, as shown in FIG. 3D. Then the exposed surface of the conductive substrate and the first plating layer were plated by electroforming with nickel to a thickness of 3 μm to form a second plating layer 19, as shown in FIG. 3E.

A discharge port member 5 having discharge ports with a diameter of 10 μm and recesses with a width of 5 μm, a length of 60 μm, and a depth of 8 μm was produced by the above process.

Next, as shown in FIG. 3F, the discharge port member 5 was separated from the substrate 11, and the first resist was peeled and removed, whereby the discharge port member 5 was obtained.

In the conventional double layer electroforming method, a second resist is patterned on a first plating layer. To prevent the patterned second resist from peeling at its end portions and narrow portions, the second resist must be increased in shape so as to communicate with a common flow path, or a dummy pattern must be formed. In the present invention, the resist layer for forming the recesses, which corresponds to the second resist in the conventional example, is patterned on the conductive substrate. Since the conductive substrate can be selected in consideration of adhesion properties with the resist, the adhesion properties between the substrate and the resist can be better than those between the resist and the plating layer. Therefore, a dummy pattern and a large resist shape are not required.

EXAMPLE 2

Example 2 of the present invention will now be described. In this Example, the liquid discharge head shown in FIG. 7A was manufactured by electroforming. In this Example, a discharge port member having discharge ports 4 arranged in straight rows with a nozzle pitch of 1,200 dpi was formed. The discharge port member formed had discharge ports having a hole diameter d of 5 μm and recesses having a width of 5 μm, a length of 60 μm, and a depth of 8 μm. The recesses were disposed in flow paths. In this Example, the discharge ports were formed to have a small hole diameter to reduce the amount discharged.

FIG. 4A is a diagram illustrating the process of manufacturing in a cross-section taken along D-D' in FIG. 7B.

First, as shown in FIG. 4A, a first resist layer 16 made of an insulating material was formed on a substrate 11 made of a stainless steel plate, or the like. In this Example, the substrate 11 was coated with silicon nitride (SiN) to a thickness of 0.1 μm, and the silicon nitride film was patterned such that the film remained on 17 μm diameter portions corresponding to the discharge ports, whereby the first resist layer 16 was formed.

Next, the substrate having the first resist layer 16 formed thereon was coated with a negative resist forming a second resist layer 17 to a thickness of 20 μm, as shown in FIG. 4B. Then a mask patterned such that the negative resist remained on portions with a width of 11 μm and a length of 66 μm in which recesses were to be formed was placed on the negative resist, and the second resist layer 17 was formed by photolithography. The second resist layer 17 was then patterned into a reverse tapered shape.

To form the reverse tapered shape, a general formation method may be used such as a method in which a plurality of stacked resist layers are patterned or a method in which patterning is performed using a gradation mask when the negative resist is exposed to light. The gradation mask used to form the resist layer into a reverse tapered shape has gradation formed in portions corresponding to the inclined reverse tapered portions of the resist layer. The gradation is formed such that the exposure amount is decreased from the inclination beginning portions of the reverse tapered portions of the resist layer toward the outer edges thereof. When the exposure is low, the upper portion of the resist layer is cured, but a portion near the substrate 11 is not cured because the light is attenuated in the resist layer and the amount of the light reaching that portion decreases. Therefore, the resist layer is formed into the reveres tapered shape.

The subsequent steps were the same as those in Example 1, and the discharge port member 5 was thereby formed.

The thus-produced discharge port member 5 had tapered recesses. Therefore, the resistance to the flow of ink is smaller than that when the side walls of the recesses are substantially vertical, and air bubbles, etc. are less likely to reside in the recesses. A liquid discharge head was obtained by bonding the discharge port member 5 obtained in this Example to flow path walls 3. Print failures such as non-discharge due to insufficient refilling with ink were not found even when the ink was continuously discharged, and therefore the liquid discharge head had good printing performance.

EXAMPLE 3

Example 3 of the present invention will next be described. In this Example, the liquid discharge head shown in FIGS. 7A and 7C was manufactured by electroforming. In this Example, a discharge port member having discharge ports 4 arranged in rows with a nozzle pitch of 1,200 dpi was formed. The discharge port member formed had discharge ports having a hole diameter d of 10 μm and recesses having a width of 5 μm, a length of 60 μm, and a depth of 8 μm.

FIGS. 6A to 6E are diagrams illustrating the process of manufacturing in a cross-section taken along E-E' in FIG. 7C.

First, as shown in FIG. 6A, a first resist layer 16 made of an insulating material was formed on a substrate 11 made of a stainless steel plate, or the like. In this Example, the substrate 11 was coated with silicon nitride (SiN) to a thickness of 0.1 μm, and the coating was patterned such that the coating remained on 16 μm diameter portions corresponding to the discharge ports.

Next, the substrate 11 and the first resist layer 16 were coated with a positive resist forming a second resist layer 17 to a thickness of 20 μm, as shown in FIG. 6B. Then the second resist layer 17 was formed on portions in which the recesses were to be formed and a third resist layer 20 was formed on the first resist layer 16 by photolithography. More specifically, the positive resist was patterned by photolithography such that the second resist layer 17 remained on portions with a width of 11 μm and a length of 66 μm in which the recesses were to be formed and the third resist layer 20 remained so as to cover the first resist layer 16.

Next, as shown in FIG. 6C, the substrate 11 having the first resist layer 16, the second resist layer 17 and third resist layer 20 formed thereon was plated by electroforming with nickel (Ni) to a thickness of 8 μm to form a first plating layer 18. In this electroforming process, holes having a diameter of 16 μm were formed in portions of the first plating layer that corresponded to the discharge ports.

Next, the entire surface was exposed to light and developed to remove only the second resist layer 17. Then the exposed surface of the conductive substrate and the first plating layer were plated by electroforming with nickel to a thickness of 3 μm to form a second plating layer 19, as shown in FIG. 6D.

A discharge port member 5 having discharge ports with a diameter of 10 μm and recesses with a width of 5 μm, a length of 60 μm, and a depth of 8 μm was thereby produced by the above steps.

Next, as shown in FIG. 6E, the substrate 11 and the first resist layer 16 were peeled and separated from the substrate 11, whereby the discharge port member 5 was obtained.

In the discharge port member 5 manufactured in this Example, the required thickness of the discharge port member can be ensured even when the density of nozzles is high. The formed discharge ports 4 substantially vertically extended from the flow path side toward their ends. A liquid discharge head was obtained by bonding the discharge port member 5 manufactured in this Example to flow path walls 3. Print failures such as non-discharge due to insufficient refilling with ink were not found even when the ink was continuously discharged, and printing performance was very good. The discharge state of the ink was observed. It was found that ink droplets discharged from the discharge ports were not deflected and had good straightness.

EXAMPLE 4

To improve the discharge characteristics of ink droplets from a liquid discharge head, an ink repellent layer is often formed on the outer peripheral surfaces of the discharge ports in which the ink droplets are formed to thereby improve ink repellency. Therefore, in this Example, an ink repellent layer was formed on the ink discharge side surface of a discharge port member.

Figure 5A:
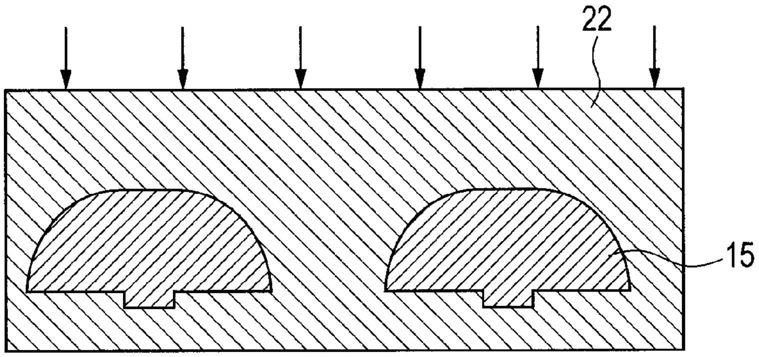
FIGS. 5A, 5B, 5C, and 5D are schematic cross sectional process diagrams illustrating an ink repellency treatment process for a discharge port member.

First, as shown in FIG. 5A, a discharge port member 5 was laminated from the lower side (the upper side in the figure) with a negative dry film resist 22 having a thickness of 70 μm using thermo-compression rollers (temperature: 60° C.) to introduce the film resist 22 into the discharge ports 4. Hereinafter, the negative dry film resist is referred to as a negative DFR.

Next, the discharge port member 5 was laminated from the upper side (the lower side in the figure) with the negative DFR 22 having a thickness of 20 μm using thermo-compression rollers (temperature: 60° C.) to sandwich the discharge port member 5 between the layers of the negative dry film resist 22. Then the discharge port member 5 was irradiated from the lower side (the upper side in the figure) with UV light, or the like to expose the entire surface to the UV light, or the like. In this Example, Riston FRA063 (product of Du Pont Kabushiki Kaisha) was used as the negative DFR.

Figure 5B:
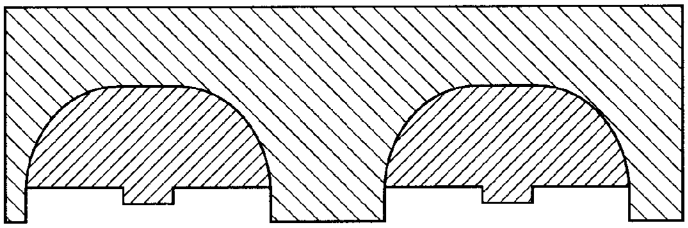

Next, unexposed portions were removed by development and rinsing, as shown in FIG. 5B. The exposed negative DFR 22 remained on the upper side of the discharge port member 5 and protruded cylindrically from the discharge ports 4.

Figure 5C:
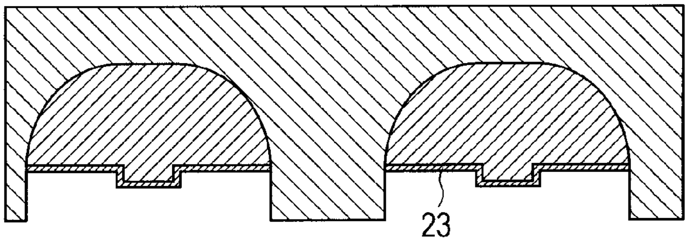

Next, as shown in FIG. 5C, an ink repellent layer made of a fluorine-based resin was formed on the surface of the discharge port member. More specifically, the negative DFR did not remain on the upper surface (discharge surface) of the discharge port member 5, and a polytetrafluoroethylene (PTFE)-Ni layer having a thickness of 2 μm was formed only on this upper surface (i.e., except for the discharge ports 4). The PTFE-Ni layer was formed by eutectoid electroplating in a nickel (Ni) electroforming solution containing PTFE particles.

Figure 5D:
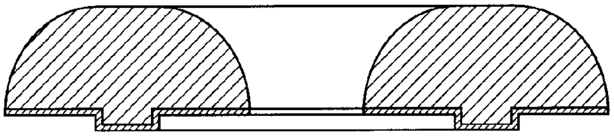

After the negative DFR was removed, a washing step and then heat treatment (at 350° C. for 1 hour) were performed, and an ink repellent layer 23 (the PTFE-Ni layer having good ink repellency) was thereby formed only on the discharge surface of the discharge port member 5 except for the discharge ports 4, as shown in FIG. 5D.

A liquid discharge head was obtained by bonding the discharge port member 5 manufactured in this Example to flow path walls 3. Print failures such as non-discharge due to insufficient refilling with ink were not found even when the ink was discharged continuously or under varying frequency, and therefore very good printing was obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-283896, filed Dec. 15, 2009, which is hereby incorporated by reference herein in its entirety.

What is claimed is:

1. A method for manufacturing a discharge port member used in a liquid discharge head from which a liquid is discharged, said discharge port member including a discharge port that discharges said liquid and a recessed portion that is a part of a wall of a flow path of said liquid, said flow path being in communication with said discharge port, said method comprising in the following order:

a step of preparing a substrate at least whose surface is conductive, said substrate having, formed on said surface, a first insulating resist for forming said discharge port and a second insulating resist for forming said recessed portion of said wall of said flow path;

a first plating step of forming on said surface a first plating layer, which forms a part of said discharge port member, by plating using said first resist and said second resist as a mask, wherein said first resist is exposed through a first opening of said first plating layer, and said second resist is exposed through a second opening of said first plating layer;

a step of removing said second resist;

a second plating step of forming a second plating layer on an exposed portion of said substrate from which said second resist has been removed, said second plating layer being formed by plating using said first resist as a mask, said second plating layer forming said recessed portion of said wall; and a step of removing said first resist to form said discharge port and removing said substrate, whereby said discharge port member is formed.

2. A method according to claim 1, wherein in said first plating step, said first plating layer including at least one selected from nickel, palladium, copper, gold, or rhodium.

3. A method according to claim 2, wherein in said second plating step, said second plating layer is formed using the same material as said material used to form said first plating layer in said first plating step.

4. A method according to claim 1, wherein in said step of preparing said substrate, said substrate prepared includes a third resist that is formed so as to cover said first resist, and wherein in said first plating step, said first plating layer is formed using, as said mask, said first resist, said second resist, and said third resist.

5. A method according to claim 4, wherein in said step of preparing said substrate, a resist material layer is formed on said substrate having said first resist formed thereon so as to cover said first resist layer, and wherein said resist material layer is partially removed to form said third resist and said second resist.

6. A method according to claim 5, wherein in said step of removing said second resist, said second resist is removed together with said third resist.

7. A method for manufacturing a liquid discharge head, comprising the steps of:

preparing a discharge port member manufactured by the method for manufacturing a discharge port member according to claim 1; and bonding said discharge port member to a substrate including an energy generation element that generates energy used to discharge a liquid, said discharge port member being bonded with said recessed portion thereof on an inner side.

* * * * *